United States Patent [19]
Pressley

[11] Patent Number: 5,948,261
[45] Date of Patent: Sep. 7, 1999

[54] PROCESS FOR TREATING BIOSOLIDS FROM WASTEWATER TREATMENT

[76] Inventor: Richard L. Pressley, 779 Courtney Dr., Crown Point, Ind. 46307

[21] Appl. No.: 09/019,530

[22] Filed: Feb. 5, 1998

[51] Int. Cl.$^6$ .............................. C02F 3/22; C02F 11/02
[52] U.S. Cl. .................... 210/609; 210/613; 210/620; 210/629; 210/149; 210/194; 210/220
[58] Field of Search .................................. 210/609, 612, 210/613, 614, 620, 629, 194, 195.1, 202, 220, 258, 259, 149

[56] References Cited

U.S. PATENT DOCUMENTS

| | | | |
|---|---|---|---|
| 3,959,125 | 5/1976 | Teletzke | 210/10 |
| 4,132,638 | 1/1979 | Carlsson | 210/7 |
| 4,166,790 | 9/1979 | Zlokarnik et al. | 210/629 |
| 4,207,180 | 6/1980 | Chung | 210/612 |
| 4,246,099 | 1/1981 | Gould et al. | 210/603 |
| 4,276,174 | 6/1981 | Breider et al. | 210/613 |
| 4,277,342 | 7/1981 | Hayes et al. | 210/609 |
| 4,440,645 | 4/1984 | Kite | 210/220 |
| 4,587,019 | 5/1986 | Wolinski | 210/608 |
| 4,690,764 | 9/1987 | Okumura et al. | 210/220 |
| 4,915,840 | 4/1990 | Rozich | 210/605 |
| 4,983,298 | 1/1991 | Fuchs et al. | 210/613 |
| 5,141,646 | 8/1992 | Rozich | 210/613 |
| 5,207,912 | 5/1993 | Winter et al. | 210/604 |
| 5,275,733 | 1/1994 | Burnham | 210/609 |
| 5,277,814 | 1/1994 | Winter et al. | 210/604 |
| 5,417,861 | 5/1995 | Burnham | 210/609 |
| 5,492,624 | 2/1996 | Rozich | 210/605 |
| 5,527,464 | 6/1996 | Bartha et al. | 210/613 |
| 5,558,774 | 9/1996 | Tonelli et al. | 210/612 |
| 5,567,325 | 10/1996 | Townsley et al. | 210/612 |
| 5,587,081 | 12/1996 | Norcross et al. | 210/604 |

FOREIGN PATENT DOCUMENTS

WO 95/13990  5/1995  WIPO .

OTHER PUBLICATIONS

Engineering Tomorrow's Effluent Treatment Solutions Today, MTS Mass Transfer Systems, Inc.
MTS Cyclo–Jet™ Floating Self–Aspirating Aerator, Waterlink Mass Transfer Systems, 1997 Waterlink, Inc.
MTS Multi–Jet™ Submersible Self–Aspirating Aerator, Waterlink Mass Transfer Systems, 1997 Waterlink, Inc.
Noxon® Decanter Centrifuges, Waterlink Sanborn Technologies, 1997 Waterlink, Inc.
The Komline–Sanderson Gravity Belt Thickener for Sludge/Slurry Volume Reduction, Gravabelt, Bulletin No. KSB 160–9211.

*Primary Examiner*—Christopher Upton
*Attorney, Agent, or Firm*—McAndrews, Held & Malloy, Ltd.

[57] ABSTRACT

The invention relates generally to a process and apparatus for treating biosolids resulting from the treatment of biological wastewater streams. The invention relates to autothermal aerobic treatment of biosolids where temperature is controlled by adjusting the amount of shear generated through jet aeration devices. The invention provides for a truly aerobic environment under which thermophilic microorganisms will thrive.

8 Claims, 4 Drawing Sheets

| Liquid Velocity Ft/S | Total Dynamic Head |
|---|---|
| 47' | 35' |
| 45' | 32' |
| 43' | 30' |
| 41' | 28' |
| 40' | 25' |
| 38' | 23' |
| 36' | 21' |
| 35' | 19' |
| 33' | 18' |
| 31' | 16' |
| 29' | 14' |

Reactor Temperature °F   135  137  139  141  143  145  147  149  151  153  155

Pump RPM   770  740  710  680  650  620  590  560  530  500  470

5,948,261

PROCESS FOR TREATING BIOSOLIDS FROM WASTEWATER TREATMENT

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The invention relates generally to a new process for the treatment of biosolids resulting from the treatment of biological wastewater streams. More particularly, the invention comprises an autothermal aerobic process for treating biosolids where the temperature is controlled by adjusting the amount of shear generated through jet aeration devices. The invention provides for a truly aerobic environment under which thermophilic microorganisms will thrive.

BACKGROUND OF THE INVENTION

Wastewater such as sewage streams generally have various naturally occurring and/or man-made contaminants, notably organic contaminants. In a remarkable display of the versatility of nature, some naturally occurring microorganisms have the ability to consume these contaminants for their own life processes, thereby turning what is an undesirable pollutant into (for their purposes) a beneficial nutrient or food source. The wastewater treatment industry frequently capitalizes on the ability of these microorganisms by using such microorganisms in facilities that treat wastewater streams to destroy the contaminants and break them down into basic compounds. Wastewater streams are fed into tanks or ponds that maintain conditions conducive to microorganism activity. Typically, the microorganisms which consume the targeted contaminants are mesophilic and thrive at temperatures in the range of about 25 to about 50 degrees Celsius.

The desired result of this type of wastewater treatment is the destruction of organic contaminants, but a by-product of this type of treatment is the production or increase of a biomass or biosolids comprised of the microorganisms. The biosolids yield from waste water treatment can range from about 0.1 pound of biosolids per pound of biological oxygen demand (BOD) removed to about 1 pound of bacteria per pound of BOD removed. A more typical range of biosolids yield is from about 0.3 pounds to about 0.6 pounds of bacteria per pound of BOD removed. Disposal of this biosolids may still be problematic, even after many contaminants have been consumed by microorganisms. One problem arises from the pathogenic nature of many microorganisms, such as the Fecal Coliform group of organisms; although such microorganisms have proven beneficial in consuming contaminants, they themselves may pose a danger to human health and are disease causing organisms. These include but are not limited to certain bacteria, protozoa, viruses and viable helminth ova. Regulations by states and/or the federal government impose restrictions upon land disposal of materials containing pathogenic microorganisms. It is desirable to treat biosolids so that one can easily and legally dispose of the biosolids on land or under ground. Suitably treated biosolids may even prove to have beneficial uses. Under certain circumstances, it may be used as a soil conditioner or fertilizer.

Another problem with the biosolids may arise from the sheer volume of biomass generated. Costs associated with the production and disposal of biosolids include both capital costs and operating expenses, such as biosolids disposal costs, trucking costs, material handling costs, management costs, and liability costs associated with disposal. Most if not all of these costs depend on the volume of biosolids at issue, and a reduction in the amount of biosolids can make an economically unfeasible operation into a profitable one. Methods which will reduce the mass and/or volume of biosolids to be disposed have significant commercial and environmental benefits.

Biosolids also contains other materials including microorganisms which are not pathogenic in nature. Typically the biosolids includes a group of microorganisms that thrive in what is generally referred to as the thermophilic temperature range. These thermophilic microorganisms are normally not harmful to humans, and there are both aerobic and anaerobic bacteria that thrive within the thermophilic range. This invention is especially interested in the aerobic microorganisms. Although the temperature ranges for classification of bacteria varies somewhat depending upon who is describing the range, thermophilic activity usually takes place within the range of from about 45° C. to about 70° C. In contrast, pathogenic bacteria usually thrive within what is referred to as a mesophilic range which is from about 25° C. to about 37° C. or the normal body temperature of humans, and may begin to die at about 38° C.

Therefore, various methods have been proposed and practiced for treating the biosolids that results from treatment of wastewaters. Biosolids may be treated aerobically or anaerobically, with different microorganisms, conditions and results. Among the methods of biosolids treatment is autothermal thermophilic aerobic digestion ("ATAD"). ATAD capitalizes on the presence of materials in the biosolids such as naturally occurring microorganisms which are not pathogenic or harmful to humans but which will kill pathogenic microorganisms. Typically, these are thermophilic microorganisms which thrive at temperatures of from about 45° C. to about 70° C.

A preferred temperature for thermophilic microorganisms is approximately 65° C. When this preferred temperature is maintained during the treatment of a wastewater biosolids, the reaction time for destruction of mesophilic microorganisms at 65° centigrade for purposes of meeting governmental regulations is approximately three quarters of an hour, as established by the Environmental Protection Agency's *Standards for Use and Disposal of Sewage Biosolids,* 40 CFR, Part 503. Three hours is an easily obtained processing time for most biosolids treatment facilities, since biosolids is often pumped once every twenty four hours from the waste water treatment plant.

In a typical ATAD process, biosolids resulting from wastewater treatment is treated in a reactor, which operates at a temperature in the thermophilic range, i.e., from about 45° C. to about 70° C. Temperatures above the above this range do not allow the thermophilic microorganisms to thrive and may even result in their destruction. Within this temperature range, thermophilic microorganisms are active in an aerobic process where they consume oxygen, which must be provided in the solution.

An advantage of an aerobic process using thermophilic microorganisms is that their use of oxygen is an exothermic reaction. The heat released as a result of this reaction raises the temperature of the biosolids solution. As the temperature rises above the mesophilic range, mesophilic microorganisms are killed and consumed by thermophilic microorganisms. It has been estimated by others that 9000 BTUs may be released for every pound of volatile suspended solids destroyed. The interrelated cycle processes in which exothermic reactions trigger additional exothermic activity by thermophilic microorganisms results in an autothermal process and thereby creates an autothermal environment by virtue of the maintenance of relatively high temperatures.

Pathogens could also be destroyed through the direct application of heat from an outside heat source to the biosolids solution. By directly heating the biosolids to temperatures that are inhospitable for mesophilic microorganisms, these pathogens may be killed. However, this type of treatment (without the action of thermophilic microorganisms) is costly and wastes energy, since the amount of heat that must be directly applied to raise the temperature of the biosolids mass is substantial.

A major challenge in operating an aerobic biosolids treatment process is to keep the process sufficiently aerobic by meeting or exceeding the oxygen demand while operating at the elevated temperatures in which thermophilic bacteria thrive. One reason why this is difficult is that as the process temperature increases, the saturation value of the residual dissolved oxygen decreases. That is, a higher temperature results in less oxygen remaining in the biosolids solution. Another reason is that the activity of thermophilic microorganisms increases with higher temperature. This higher activity results in increased oxygen consumption by the microorganisms. Hence, greater amounts of oxygen must be imparted to the biosolids solution.

Another major challenge is to operate the process in an autothermal condition while still maintaining some control over the operating temperature. In an autothermal process, the process operates at a temperature higher than ambient without adding heat or by adding less heat than would ordinarily be needed to maintain the process at that temperature. In the biosolids treatment industry, autothermal processes capitalize on the exothermic nature of the action of the thermophilic bacteria in breaking down and consuming mesophilic bacteria or other organic compounds. The use of autothermal processes can obviate the need for external heat supply. However, it is still desirable or necessary to have some means of controlling the temperature of the process.

The need to control temperature has been previously identified and discussed in U.S. Pat. No. 5,587,081, which discloses a method of controlling temperature by varying the proportion of fresh air versus recycled air injected into the biosolids. By increasing the amount of fresh cool air introduced, the reactor is cooled. However the inventor believes it is important to use fresh air in the injection process because recycled air is not as effective in providing oxygen for thermophilic bacteria to thrive. The process described in U.S. Pat. No. 5,587,081 does not appear to take into account the fact that recycled air, although warmer than fresh air, has less oxygen and will generate less exothermic reaction and heat from the thermophilic microorganisms. The recycled air has a lower content of oxygen than is found in ambient air. This results in less oxygen being imparted to the biosolids solution by the recycled air. Although at first glance, it may appear that the effect of the reduced oxygen content is minimal because the reduction in oxygen may be only a few percent, in practice the reduced oxygen content results in insufficient oxygen being imparted to the solution to create a truly aerobic environment for the aerobic microorganisms to thrive.

Various apparatus and methods have been used to inject an oxygen containing gas stream into a biosolids solution. For example, spargers, diffusers and aerators of various designs and configurations have been used. It is the inventor's opinion that the best apparatus to deliver the necessary oxygen is the aeration jet. One such aeration jet has been developed by Mass Transfer Systems, Inc., ("MTS") 100 Waldron Road, Fall River, Mass. A product brochure by MTS is enclosed herein and incorporated by reference. By using the aeration jet, it is possible to create finer air bubbles along with higher shear which results in greater introduction of oxygen into the biosolids solution. There are many other advantages associated with the aeration jet, including better mixing. As the biosolids treatment occurs and mesophilic bacteria are broken down, carbon dioxide, water and ammonia (as well as other organic compounds) are produced when the protoplasm within the cell is released into the biosolids solution. The ammonia raises the pH of the solution and causes a noxious odor. Additionally, cell breakdown results in foam. It is desirable to have some means to treat odor and foam.

SUMMARY OF THE INVENTION

The inventive process has been referred to by its inventor as the THERMAER™ Process. The invention provides a method for controlling the temperature of an autothermal process by adjusting the flow rate(s) through a jet aeration nozzle of circulated biosolids solution and/or oxygen-containing gas, thereby adjusting the rate of exothermic reaction from the interaction of oxygen with aerobic thermophilic microorganisms. The mechanism by which the biosolids flow rate and/or gas flow rate affects the reaction rate is through the amount of shear produced as the biosolids solution mixes with the oxygen-containing gas stream in the jet aeration nozzle. A higher amount of shear induces more reactions by the thermophilic organisms, thereby producing more heat. Lowering the biosolids flow rate and/or the gas flow rate results in less shear, which in turn induces less exothermic reaction by the microorganisms.

By maintaining an autothermal, truly aerobic treatment environment, numerous process advantages ensue as well as a better digested biosolids product. Objects of the present invention include significantly reducing the volatile solids in the biomass, reducing the total mass of biosolids and producing a stabilized material suitable for land disposal. Another objection of the present invention is to create and maintain a truly aerobic environment for the treatment of waste water biosolidss. A truly aerobic biological process has sufficient oxygen present to support the living organisms' respiration rates and does not allow an anoxic condition to occur.

The THERMAER™ Process which incorporates the present invention involves the surprisingly effective use of lower air flows and higher liquid flows. Counterintuitively, the use of a lower airflow can actually increase the amount of oxygen imparted into solution. It is believed that using a lower air flow process results in the injection of extremely fine bubbles into the treatment solution and higher surface renewal of the solution.

The present invention facilitates the treatment of biosolids in an autothermal process by removing a high percentage of water and increasing the organic concentration in a biosolids thickening process that precedes introduction of the biosolids into the treatment reactor. By thickening the biosolids, the volume of the biosolids solution may be significantly reduced, thereby enabling greater temperature control through the use of liquid flow rate.

The inventive process may be tailored to virtually any individual application. Different industrial plants have different product mixes with different sets of constituents. The complexity of the organic chemistry can vary from short chain molecules that are readily broken down to long chain molecules that are difficult to break down. The THERMAER™ Process has the flexibility to deal with varying plant conditions and can operate at varying liquid depths, at varying hydraulic and solids retention times and operate as a single tank reactor or multiple tank reactors.

In the preferred embodiments of the present invention, the temperature of a truly autothermal aerobic process is controlled through a variable frequency drive on a jet motive pump which circulates biosolids through the jet aeration device into the reactor. Reactor temperature is controlled by varying the force in which the biosolids solution is circulated or re-circulated into the reactor through an aeration jet or other suitable means. In other embodiments, reactor temperature is controlled through the air pump used to control the flow rate of oxygen-containing gas through the jet aeration device.

In the present invention, the perceived problem of foaming caused by the treatment process is turned into an advantage. The inventor has noted that foam can act as an insulator between the biosolids solution and the air in the top of the reactor. In a typical reactor, the reactor is vented to the atmosphere so that it is not under pressure. As a result, the temperature of the air in the reactor is affected by the temperature of outside the reactor; in some cases, the temperature of the air in the reactor may be the same as the ambient temperature outside. By refraining from destroying all the foam bubbles, it is possible to use the foam as an insulator between the biosolids solution and the air in the reactor. Preferably, a foam control system is operated to maintain a layer of foam having a depth of from about four to about eight feet, preferably about six feet.

The inventive process may be used to treat a biosolids solution comprised of the products of waste water treatment and thermophilic bacteria capable of digesting mesophilic bacteria. The process comprises the steps of (a) thickening biosolids solution before it first enters a biosolids treatment reactor to a concentration of from about 3% to about 6% solids; (b) mixing a portion of biosolids solution with an oxygen-containing gas stream using a jet aeration device; (c) injecting a mixture of the oxygen-containing gas and biosolids solution into a reactor at a flow rate which introduces sufficient oxygen into the study solution so that the treatment environment is substantially constantly aerobic; and (d) controlling the temperature of the biosolids solution by adjusting an amount of shear generated through the jet aeration device. In some embodiments, the amount of shear (and the temperature of the biosolids solution) is controlled by adjusting the liquid flow rate of biosolids through the jet aeration device while keeping the flow rate of oxygen-containing gas constant. In most embodiments the portion of biosolids solution mixed with oxygen-containing gas in the jet aeration device will be recirculated biosolids that has been removed from the general biosolids solution in the reactor and pumped through the jet aeration device.

The inventive process may also include the step of wasting a portion of treated biosolids wherein the wasting step is performed in the same apparatus in which the thickening step is performed. "Wasting" is a term used in the industry to mean dewatering biosolids prior to its disposal.

Alternate embodiments of the present invention comprise an apparatus for autothermal aerobic treatment of wastewater treatment biosolidss. That apparatus comprises a means for concentrating a wastewater treatment biosolids to a concentration of at least about 3 percent solids. Among the suitable means for concentrating the biosolids solution are a horizontal solid bowl-decanting centrifuge, a gravity belt, a rotary drum thickener, dissolved air flotation, gravity settling, or the application of evaporative heat. The apparatus also comprises a reactor having an inlet from said concentrating means for the introduction of at least one biosolids and a jet aeration device affixed to the bottom of the reactor.

The jet aeration device comprises an air header having one or more openings through which a gas transported through the air header may exit the air header; a liquid header running parallel to and/or concentric with the air header and having one or more openings through which a biosolids solution transported through the liquid header may exit the liquid header; an outer nozzle extending from the liquid header and having an opening on its side; an inner nozzle from the liquid header and contained within the outer nozzle; one or more air passage connections from the air header to the outer nozzle which connects the air header to the liquid header and provides a closed path for air from the air header to travel to the outer nozzle and enter the outer nozzle through its side opening; and liquid from the liquid header are mixed in the outer nozzle. The apparatus comprises an air distribution pipe connected to the air header, which provides an oxygen-containing gas from outside the reactor; and a liquid outlet located at or near the bottom of the reactor, which allows biosolids solution to exit the reactor. The apparatus may optionally include a motive pump connected to the liquid outlet such that biosolids solution is withdrawn from the reactor by the motive pump. Attached to the motive pump is a motive pump conduit that leads from the motive pump to the liquid header such that biosolids solution is pumped through the conduit into the liquid header and forced through the inner nozzle by force of the motive pump.

The present invention may also include apparatus for automatically sensing and controlling the temperature in the reactor by adjusting the rate at which liquid is circulated into the reactor through the jet aeration device. This apparatus will typically include a temperature sensor within the reactor and means for automatically controlling the motive pump. Suitable means for automatically controlling include a programmable logic controller ("PLC"), a computer, analog signal or a microprocessor. This automatic control means is operatively attached to the temperature sensor and the motive pump such that based on the temperature of the biosolids solution in the reactor as measured by the temperature sensor, the automatic control means will instruct the motive pump to adjust the flow of biosolids solution through the liquid header in order to adjust the temperature of the biosolids solution in the reactor.

Apparatus embodying the present invention may also comprise a secondary cooling system, which comprises a cooling jet nozzle located in the reactor above the level of the jet aeration device; and a cooling conduit extending from the motive pump conduit to the cooling jet nozzle such that biosolids solution traveling through the cooling conduit loses heat to the surrounding environment.

In one embodiment of the present invention, the reactor holds a biosolids solution having a depth of at least about 24 feet. Another benefit of the present invention is it can be used in larger reactors. Because the invention can be used in larger reactors, the residence time of biosolids in a reactor can be increased so that biosolids may remain in a single reactor throughout the entire treatment period.

DETAILED DESCRIPTION OF DRAWINGS AND PREFERRED EMBODIMENT

Figure 1:
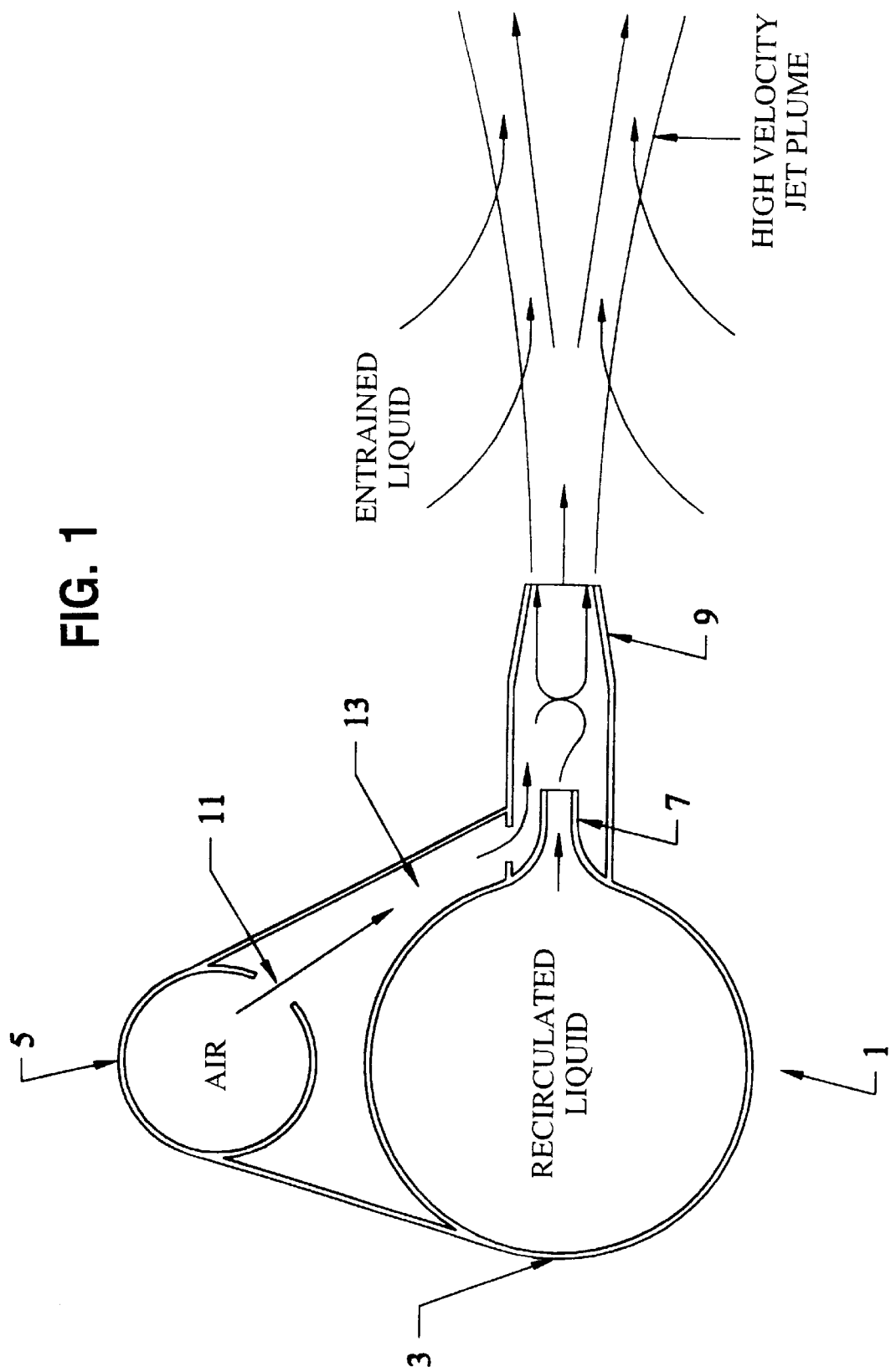
FIG. 1 shows a cross section of a jet aeration nozzle used in the invention.

The inventor contemplates that preferred embodiments of the invention will involve the use of a jet aeration device. FIG. 1 shows a cross-section of a jet aeration device 1. The device includes a liquid header 3 and an air header 5. The liquid header and the air header may be longitudinal, circular or radial in shape. The liquid header 3 transports a liquid such as an untreated or recycled biosolids stream. The liquid header 3 has a relatively small opening or inner nozzle 7 which allows the liquid to exit from the liquid header into an outer nozzle 9 or other conically shaped structure. The air header 5 also has an air header opening 11 which allows the gas to exit through an air passage way 13 into the same outer nozzle 9. In the outer nozzle 9, the gas and the liquid mix so as to create a shear that induces the exothermic action of the thermophilic microorganisms. The air header 5 carries a gas such as an oxygen-containing gas useful for an aerobic process. Typically the source for the oxygen-containing gas is ambient air outside the reactor; however, the gas may be obtained from any source provided that it contains sufficient oxygen for a truly aerobic process. The inventor believes that such a gas should have at least the concentration of oxygen found in ambient air (approximately 21.9 percent by volume).

The jet aeration device 1 must have the ability to transfer a high amount of oxygen-containing gas into a high suspended solid concentration while completely mixing the reactor contents. When the liquid is mixing with the air, a shear is produced. The inventor contemplates that the flow rate of biosolids solution through the inner nozzle of a jet aeration device would be in the range of from about 30 feet/second to about 50 feet/second.

Figure 2:
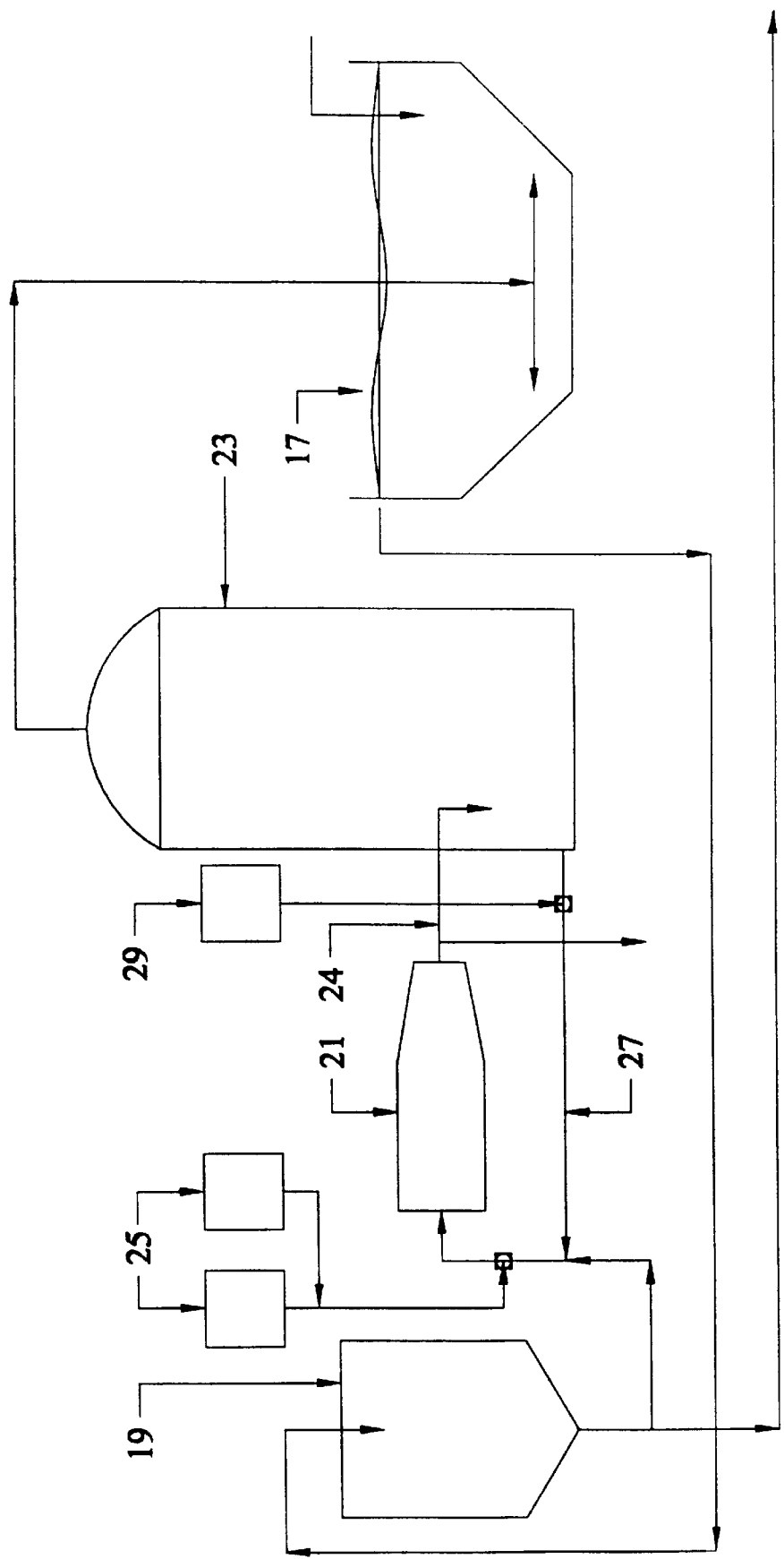
FIG. 2 shows a biosolids treatment system as a integrated part of a waste water and biosolids treatment facility.

FIG. 2 is a schematic of an integrated treatment system for the initial treatment of wastewater and the secondary treatment of the biosolids resulting from that initial treatment. Wastewater is treated in an aeration basin 17, resulting in the production of an effluent comprising biosolids and water. The biosolids typically has various mesophilic and thermophilic microorganisms. The effluent is transported to a clarifier 19 which separates a portion of biosolids solution to be disposed of. The clarifier 19 can accept biosolids from a number of sources and of several different make-ups. After the biosolids solution leaves the clarifier 19, a portion of the biosolids may be returned to the aeration basin 17 to insure that it has sufficient amounts of active microorganisms to devour the waste water contaminants. Another portion of the biosolids will be sent for treatment according to the present invention prior to ultimate disposal. To the biosolids that is to be treated, one may choose to add one or more charge neutralizing polymers from polymer containers 25 to allow for greater flocculation of the biosolids. Alternately, a thickening polymer may be added to the biosolids solution as it is being concentrated.

The portion of biosolids to be treated and disposed is transferred to a means for concentrating the biosolids to a higher solids concentration. Any suitable means may be used for concentrating the biosolids solution. One preferred means is a horizontal solid bowl-decanting centrifuge 21. Other means include a gravity belt, a rotary drum thickener, a DAF, gravity settling, or the application of evaporative heat. The centrifuge may be controlled by a separate PLC that can be programmed to operate on more than one process curve. A PLC can monitor the torque that is produced on the biosolids cake and adjust the scroll speed accordingly to achieve consistent results. Typically, the solids content of a biosolids prior to treatment is from about 0.5% to about 1.5% with a volatile solids content of from about 65% to about 90%, with 80% preferred. The inventor has found it desirable to concentrate the biosolids solution to a solids content of from about 3% to about 6%, with 5% to 5.5% being preferred, prior to treating the biosolids solution. The inventor has found it necessary to thicken the biosolids to a solids content of from about 3% to about 6% in order to run an optimal autothermal treatment process.

From the centrifuge, the biosolids solution is transferred to a treatment reactor 23 via a feed line 24. After treatment, digested biosolids may be removed from the reactor 23 via a removal pipe 27 which transfers the biosolids to the same or a different concentrating means. Preferably the same concentrating means 21 is now used to reduce the water content of the treated. A coagulant tank 29 for a coagulant such as ferric chloride may also be provided and operatively connected to the removal pipe 27 so that coagulant may be introduced into digested biosolids. From the concentrating means, the biosolids is removed by a conveyor system and sent for disposal. Biosolids will generally be removed from the reactor on a batch per day basis. The volume of biomass removed from the reactor will typically be about the same as the volume of biosolids to be introduced into the reactor for treatment that day. Using the same concentrating means to remove water before and after treatment in the reactor may achieve substantial savings on the cost of capital equipment.

Figure 3:
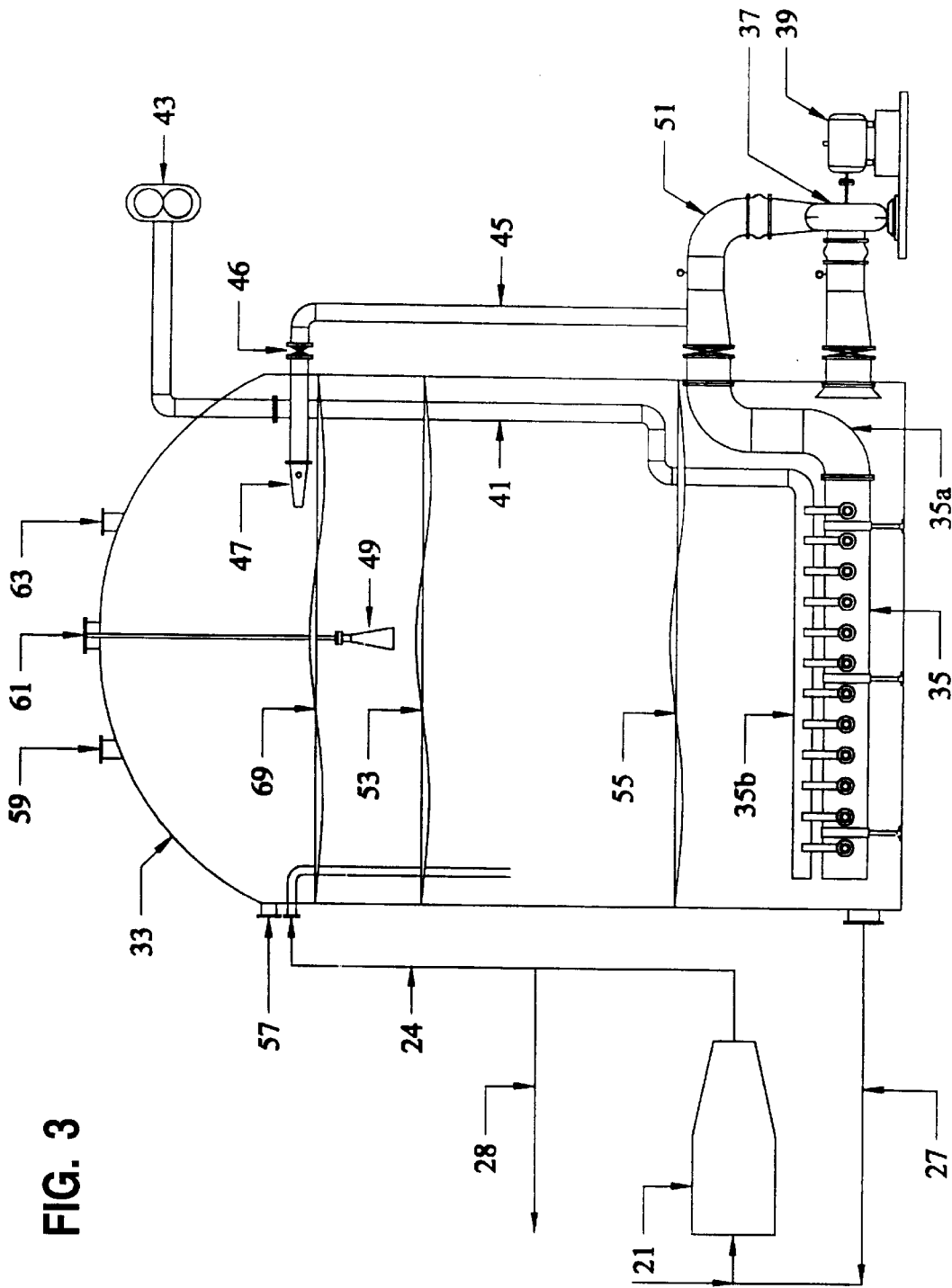
FIG. 3 shows a biosolids treatment reactor and associated process equipment for the biosolids treatment process.

FIG. 3 shows a treatment reactor 33 in greater detail and associated process equipment for the biosolids treatment process. The reactor 33 contains a biosolids solution that is treated according to the inventive process. The reactor contains an arrangement or unitary sequence of jet aeration devices 35 (as described above and shown in cross-section in FIG. 1) affixed to the bottom floor of the reactor. Preferably, the outer nozzles of the jet aeration device 1 point around the reactor.

A motive pump 37 may be employed to circulate the biosolids solution through the liquid header 35a (shown in cross-section in FIG. 1 as liquid header 3). The motive pump 37 pumps the biosolids solution through the liquid header 35a of the jet aeration device 35. It is preferred that the motive pump 37 have a variable frequency drive 39 or other means of varying the liquid flow, which may vary the force generated by the motive pump 37, thereby varying the flow rate and pressure of the biosolids solution through the liquid header 35a and through the outer nozzle 9 (shown in FIG. 1). A varying flow rate is desirable because it is desirable to have the ability to control the liquid flow rate through the liquid header 35a in order to control the amount of energy generated by shear.

Air or another oxygen-containing gas is introduced from outside the reactor through an air distribution pipe 41 whose upstream end is connected to one or more air blowers 43 which blow air or another suitable oxygen-containing gas through the air distribution pipe 41. The air distribution pipe 41 transports air or gas to the air header 35b (shown in FIG. 1 as air header 5). The air header 35b may be detached from or affixed to the liquid header 35a.

Different amounts of energy are needed at different phases of the treatment operation. During the start-up phase, when a batch of untreated biosolids solution is first introduced into the reactor 17, a large amount of shear is required to begin the exothermic reaction to the extent necessary to bring the reactor contents up to the operating temperature, which is from about 55 degrees Celsius to about 65 degrees Celsius, alternately about 63 degrees Celsius. The motive pump 37 is operated at the speed necessary to obtain a desired shear due to a high liquid flow rate until the viscosity of the biosolids solution has reached a normal operating level. At that time, the motive pump 37 is slowed so that the liquid flow rate is sufficient to sufficiently mix the contents of the reactor so that exothermic reactions continue and to inject oxygen-containing gas into the biosolids solution flowing from the liquid header. After start-up, the biosolids solution in the reactor 33 should operate at a self-regulating autothermal temperature at which the heat provided by exothermic reactions is in equilibrium with the heat lost to the outside environment.

A temperature sensor may be provided inside the reactor to measure the temperature of the biosolids solution and send a signal to a suitably programmed PLC connected to the motive pump. An indirect method of sensing the temperature of the biosolids solution is to measure the oxygen reduction potential ("ORP") of the biosolids solution. ORP is directly related to temperature. A high negative value for ORP indicates that the biosolids solution has a high oxygen up-take requirement and that the speed of the motive pump should increase to provide more oxygen and raise the temperature. Using an ORP sensor instead of a direct temperature sensor would require an additional set of data points connecting ORP values to temperatures for a given system.

A PLC may be programmed so that it will speed the motive pump if the temperature of the biosolids solution drops below the minimum desirable temperature. The effect of speeding the motive pump will be to increase the liquid flow rate in the jet aeration device and to increase the shear, thereby increasing the exothermic reaction by the thermophilic organisms. This increased reaction will provide additional heat, raising the temperature. Conversely, if the temperature of the biosolids solution rises above the maximum desirable temperature, the PLC will send a signal to the motive pump, which slows the motive pump. This will reduce the liquid flow rate and shear, thereby reducing the level of exothermic reaction and heat produced thereby. In this way, the inventive system automatically maintains the temperature of the biosolids solution within a predetermined range through the liquid flow rate. The motive pump is operated within a predetermined range of speeds that is set by the flow and pressure curve for each individual application.

Parameters for a PLC or other means of automatically controlling the motive pump must be uniquely generated for each particular installation because each installation has unique reactor and conduit configurations, biosolids concentrations, and pump characteristics. Typically, one identifies the corresponding temperature and pump parameters by plotting empirically determined temperature data points on the performance curve for the motive pump supplied by the seller of the pump. The highest desired temperature is plotted at the lowest desired RPM and corresponding flow rate for a given resisting pressure, or head. For example, for a model 3180/3185 pump, a minimum desired temperature of about 135 degrees F might be plotted at about 900 RPM, and the maximum desired temperature of about 155 degrees F might be plotted at about 500 RPM.

After the reactor contents have reached a desirable temperature, an appropriately programmed PLC device will cause the variable frequency drive to maintain the motive pump at a constant rate. During certain operating conditions, the exothermic reactions may create too much heat. If the temperature of the biosolids solution is too high, the thermophilic microorganisms may not thrive or may be killed. Other possible adverse effects of having too high a temperature are excessive foam or odor. To account for the possibility that the reactor's normal operating temperature is normal that the desired operating temperature, the present invention provides a secondary cooling system which is comprised of a fluid by-pass which allows re-circulated biosolids solution to surrender heat.

The secondary cooling system is generally a liquid by-pass that transfers the reactor contents above the foam layer and through a jet-cooling nozzle. This action exposes the reactor contents to the atmosphere above the foam layer, thus causing the reactor contents to release heat. The secondary cooling system may be include a conduit 45 located outside the reactor which routes biosolids above the foam layer. This conduit 45 may attached to the pipe leading from the motive pump back into the reactor. An actuated valve 46 may be placed so that the biosolids solution's access to the conduit 45 is controlled, perhaps through the PLC based on the reading of the temperature sensor. The secondary cooling system may also comprise a cooling jet nozzle 47 at the downstream end of the cooling conduit. The cooling jet nozzle 47 injects the biosolids solution back into the reactor 33 at a predetermined location or height.

In one embodiment of the present invention, the air blowers 43 will typically operate at a constant volume. It is believed that greater process control is achieved by maintaining the air flow rate constant while varying the liquid flow rate to control temperature. In other embodiments, the air flow may be varied as a method of controlling temperature.

The present invention uses a lower air rate and a higher liquid flow rate to create an extremely fine bubble and a high shear factor. For example, whereas a typical air flow may be as high as 80 scfm, the present invention employs an air flow rate of approximately 10 to 25 scfm, alternately 16 to 20 scfm. Whereas a typical liquid velocity may be about 30 to 33 ft/s, the present invention generally employs a liquid velocity of about 40 to 55 ft/s. The result of the lower air rate and the higher liquid rate is an extremely fine bubble and a high shear factor.

Volatile suspended solids are live cells. The dead cells cause a putrescible odor. The present invention may be used with a reactor of any height or with a biosolids solution of any depth. However, it is preferred that the biosolids solution be at a depth of at least about 10 feet, alternatively at least about 24 feet, alternatively less than about 30 feet. It is believed that depths of about 24 feet are optimal because oxygen transfer increases with increased depth, as the oxygen-containing gas is released into the biosolids solution at increased pressures. The maximum liquid depth of the biosolids solution (shown for general illustrative purposes in FIG. 3 as a line 53) for existing apparatus is set by the pressure limitation of the air blowers and the mixing limitation of the tank geometry. The minimum liquid depth (shown for general illustrative purposes in FIG. 3 as a line 55) is generally no lower than the center line of the positive pressure liquid pipe 51 leading from the motive pump 37 to the reactor 33.

In some preferred embodiments of the invention, foam is controlled by means other than physically contacting the foam to rupture its bubbles. Instead, foam is controlled in ways that do not physically contact the foam yet still rupture an appropriate amount of foam bubbles. One such way is the use of a sonic horn 49 to rupture foam bubbles through sonic waves of an appropriate frequency. The horn may be sounded at appropriate intervals so that sufficient foam remains to cover the biosolids solution but the danger of foam spilling over the top of the reactor is minimized. The sonic horn may be activated and controlled by a timer and a solenoid valve. In one embodiment of the inventive process, the sonic horn is activated for approximately five minutes with off-intervals ranging from between about ten minutes to about 55 minutes, preferably about 25 minutes.

The reactor 33 typically also has additional features which do assist in operation. The reactor 33 may have an overflow outlet 57 through which excess foam may escape and be diverted to a foam containment area or container. The reactor 33 typically has vent 59 which allows the reactor volume to remain at atmospheric pressure and an off-gas outlet 61 at or near the top of the reactor 33 which is attached to a source of partial vacuum, thereby pulling off-gas out of the reactor 33. The off-gas is removed at a rate that exceeds the incoming volume of air and compensates for the air expansion that occurs from heating. The off-gas, which may have a foul odor, can be routed to the aeration basin 17 (shown in FIG. 2) where the contaminants which cause the foul odor can either be solubilized through pH and temperature reduction or adsorbed by the biosolids microorganisms and utilized for food. The reactor may also have a foam level detector 63 that will shut down the aeration blower 43 if the foam reaches too high a level.

After treatment in the reactor, the biosolids solution or a portion thereof is removed and transferred to the concentrating means so that it may be dewatered. After this concentrating step, the biosolids may be disposed.

Figure 4:
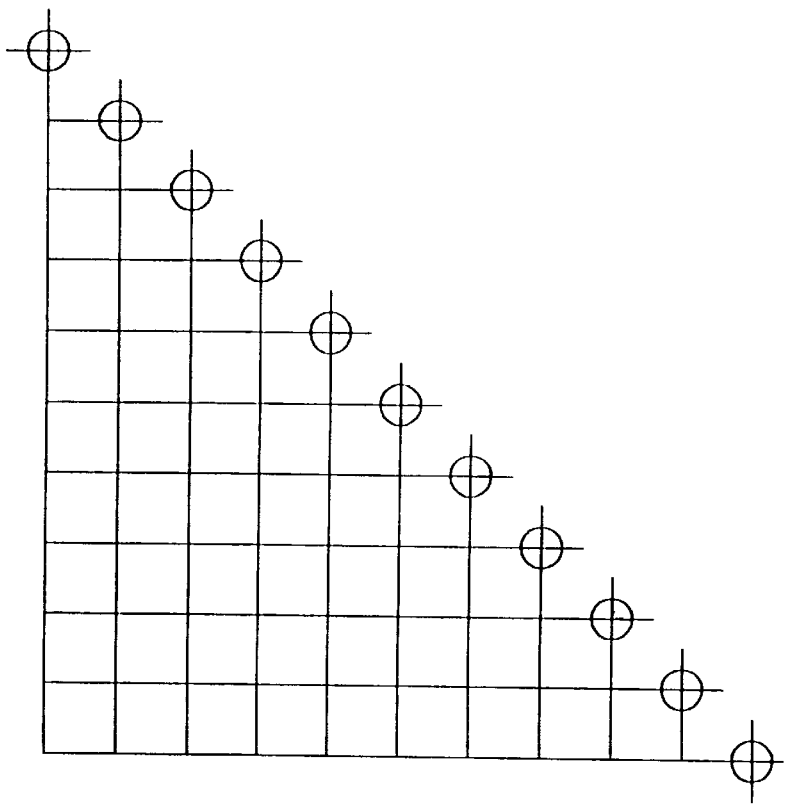
FIG. 4 shows a temperature correlation chart for a hypothetical installation of the invention, wherein the appropriate pump speed is set for a given temperature of the biosolids solution.

FIG. 4 is a chart which correlates the temperature of the biosolids solution to the speed of the motive pump, the velocity of biosolids solution through the inner nozzle of the jet aeration system and the total dynamic head, which is a measure of pressure against which the jet aeration device injects biosolids solution into the reactor. The chart in FIG. 4 could be provided to a programmer to program a PLC to run the motive pump at the speed (in RPM) specified for each of the given temperatures. Based on this chart, the PLC would make the motive pump run at a speed of 770 RPM if the temperature sensor measured a reactor temperature of 135 degrees F.

Although FIG. 4 is useful to show the relation between the plotted parameters, it may or may not be appropriate for a given installation due to the unique reactor characteristics and configurations and biosolids concentration associated with each installation. FIG. 4 is a hypothetical chart based on the inventor's approximation of an appropriate correlation.

A correlation chart for an actual installation can be made in the following way. First, after selecting the desired operating temperature, one finds the motive pump speed that corresponds to that temperature. This becomes the target pump speed. When the reactor temperature rises above the desired temperature, the PLC must be programmed to decrease the speed of the motive pump and vice versa. Generally, the maximum acceptable operating temperature will correlate to the lowest acceptable pump speed. Though the exact pump speeds associated with temperatures higher or lower than the desired temperature are somewhat subjective, it is preferable to have a series of possible pump speeds that correspond with the range of possible operating temperatures rather than having the pump run at its highest or lowest speeds in response to a variation from the desired temperature. This is preferrable because it is easier on the system and more energy efficient.

What is claimed is:

1. A process for the aerobic treatment of biosolids solution comprised of the products of waste water treatment and thermophilic bacteria capable of digesting mesophilic bacteria, said process comprising:
    (a) thickening the biosolids solution before it first enters a biosolids treatment reactor to a concentration of from about 3% to about 6% solids;
    (b) mixing a portion of biosolids solution with an oxygen-containing gas stream using a jet aeration device;
    (c) injecting a mixture of the oxygen-containing gas and biosolids solution into the reactor at a flow rate which introduces sufficient oxygen into the biosolids solution so that the treatment environment is substantially constantly aerobic; and
    (d) controlling the temperature of the biosolids solution by adjusting the amount of shear generated through the jet aeration device.

2. The process of claim 1 further comprising the step of dewatering a portion of treated biosolids wherein the dewatering step is performed in the same apparatus in which the thickening step is also performed.

3. The process of claim 1 further comprising the step of maintaining a foam layer having a depth of from about four feet to about eight feet on top of the biosolids solution in the reactor.

4. The process of claim 1 wherein the temperature of the biosolids solution is controlled by adjusting the liquid flow rate of biosolids through the jet aeration device while keeping the flow rate of oxygen-containing gas constant.

5. An apparatus for autothermal aerobic treatment of waste water treatment biosolids comprising:
    means for concentrating a waste water treatment biosolids to a concentration of at least about 3 percent solids;
    a reactor having an inlet from said concentrating means for the introduction of at least one biosolids;
    a jet aeration device affixed to the reactor, said device comprising:
        an air header having one or more openings through which a gas transported through the air header may exit the air header;
        a liquid header running parallel to and/or concentric with the air header and having one or more openings through which a biosolids solution transported through the liquid header may exit the liquid header;
        an outer nozzle extending from the liquid header and having an opening on its side;
        an inner nozzle from the liquid header and contained extending within the outer nozzle;
        one or more air passage connection from the air header to the outer nozzle which connects the air header to the liquid header and provides a closed path for air from the air header to travel to the outer nozzle and enter the outer nozzle through its side opening; and liquid from the liquid header are mixed in the outer nozzle;
    an air distribution pipe connected to the air header, which provides an oxygen-containing gas from outside the reactor;
    a liquid outlet located at or near the bottom of the reactor, which allows biosolids solution to exit the reactor;
    a motive pump connected to the liquid outlet such that biosolids solution is withdrawn from the reactor by the motive pump;

a motive pump conduit leading from the motive pump to the liquid header such that biosolids solution is pumped through the conduit into the liquid header and forced through the inner nozzle by force of the motive pump;

a temperature sensor within the reactor; and means for automatically controlling the motive pump operatively attached to the temperature sensor and the motive pump such that based on the temperature of the biosolids solution in the reactor as measured by the temperature sensor, the automatic control means will cause the motive pump to adjust the flow of biosolids solution through the liquid header in order to adjust the temperature of the biosolids solution in the reactor.

6. The apparatus of claim 5 further comprising a secondary cooling system, which comprises:

a cooling jet nozzle located in the reactor above the level of the jet aeration device; and a conduit extending from the motive pump conduit to the cooling jet nozzle such that biosolids solution traveling through the conduit is routed above the foam level of the biosolids solution.

7. The apparatus of claim 5 wherein the reactor holds a biosolids solution having a depth of at least about 24 feet.

8. The apparatus of claim 5 comprising a single reactor.

* * * * *